US012482362B2

(12) United States Patent
Altus et al.

(10) Patent No.: US 12,482,362 B2
(45) Date of Patent: *Nov. 25, 2025

(54) SYSTEMS AND METHODS FOR MONITORING A FLIGHT PLAN OF AN AIRCRAFT

(71) Applicant: THE BOEING COMPANY, Arlington, VA (US)

(72) Inventors: Stephen Solomon Altus, Campbell, CA (US); William Jenden, Vancouver (CA); Peng Chen, Vancouver (CA); Shefali Sharma, Mountain View, CA (US)

(73) Assignee: The Boeing Company, Arlington, VA (US)

( * ) Notice: Subject to any disclaimer, the term of this patent is extended or adjusted under 35 U.S.C. 154(b) by 171 days.

This patent is subject to a terminal disclaimer.

(21) Appl. No.: 18/465,270

(22) Filed: Sep. 12, 2023

(65) Prior Publication Data

US 2024/0005803 A1   Jan. 4, 2024

Related U.S. Application Data

(63) Continuation-in-part of application No. 17/653,667, filed on Mar. 7, 2022, now Pat. No. 12,354,485.

(51) Int. Cl.
*G08G 5/34* (2025.01)
*G08G 5/26* (2025.01)

(52) U.S. Cl.
CPC .............. *G08G 5/34* (2025.01); *G08G 5/26* (2025.01)

(58) Field of Classification Search
None
See application file for complete search history.

(56) References Cited

U.S. PATENT DOCUMENTS

| | | | |
|---|---|---|---|
| 6,922,631 B1 * | 7/2005 | Dwyer | G01C 23/00 701/467 |
| 8,862,287 B1 * | 10/2014 | Clark | G01C 23/00 705/2 |
| 9,734,723 B1 * | 8/2017 | Bruno | G01C 21/3826 |
| 9,858,824 B1 * | 1/2018 | Zogg | G08G 5/32 |
| 10,559,212 B1 * | 2/2020 | Langer | G08G 5/21 |
| 11,176,833 B1 * | 11/2021 | McGaughy | G08G 5/55 |
| 11,380,208 B1 * | 7/2022 | Moeykens | G08G 5/26 |

(Continued)

FOREIGN PATENT DOCUMENTS

EP     3534120 A1 *  9/2019  ............. B64C 30/00

OTHER PUBLICATIONS

Volpe Center, SWIM Flight Data Publication Service (SFDPS) Data Consumer Reference Manual, Dec. 26, 2017, Volpe, pp. 1-214 (Year: 2017).*

*Primary Examiner* — Justin S Lee
(74) *Attorney, Agent, or Firm* — Joseph M. Butscher; The Small Patent Law Group LLC

(57) ABSTRACT

A system and a method include a monitoring control unit configured to compare an initial flight plan, as generated by a flight planner for an aircraft, and an assessed flight plan, as determined by air traffic control. The monitoring control unit is further configured to determine one or more alternate initial flight plans that differ from the initial flight plan in response to determining one or more differences between the initial flight plan and the assessed flight plan.

20 Claims, 3 Drawing Sheets

(56) References Cited

U.S. PATENT DOCUMENTS

| | | | |
|---|---|---|---|
| 11,572,183 B1* | 2/2023 | Overfield | G05D 1/0088 |
| 2009/0228202 A1* | 9/2009 | Wipplinger | G01C 23/00 |
| | | | 701/467 |
| 2010/0030401 A1* | 2/2010 | Rogers | G01C 23/00 |
| | | | 701/3 |
| 2010/0250026 A1* | 9/2010 | Deker | G01C 23/00 |
| | | | 715/810 |
| 2013/0046422 A1* | 2/2013 | Cabos | G08G 5/32 |
| | | | 701/120 |
| 2014/0005861 A1* | 1/2014 | Mere | G08G 5/55 |
| | | | 701/3 |
| 2015/0199906 A1* | 7/2015 | Judy | G08G 5/30 |
| | | | 701/3 |
| 2017/0069213 A1* | 3/2017 | Thomas | H04W 4/14 |
| 2017/0183105 A1* | 6/2017 | Fournier | G01W 1/06 |
| 2017/0233108 A1* | 8/2017 | Kleywegt | G01M 1/125 |
| | | | 701/29.1 |
| 2018/0075758 A1* | 3/2018 | Martinez | G08G 5/50 |
| 2018/0082595 A1* | 3/2018 | Hamilton | B64D 43/00 |
| 2018/0239948 A1* | 8/2018 | Rutschman | G06T 7/20 |
| 2018/0366010 A1* | 12/2018 | Agam | G08G 5/32 |
| 2019/0147748 A1* | 5/2019 | Boozarjomehri | G08G 5/56 |
| | | | 701/120 |
| 2020/0079532 A1* | 3/2020 | Rix | B64D 45/00 |
| 2021/0192961 A1* | 6/2021 | Lebbos | G08G 5/34 |
| 2022/0013018 A1* | 1/2022 | Schwindt | G08G 5/76 |
| 2022/0238025 A1* | 7/2022 | McCann | G08G 5/26 |
| 2022/0250768 A1* | 8/2022 | Oshima | B64F 1/32 |
| 2023/0023800 A1* | 1/2023 | Da Conceicao | G08G 5/21 |
| 2023/0040301 A1* | 2/2023 | Da Conceicao | G06Q 50/40 |
| 2023/0057311 A1* | 2/2023 | Moeykens | G08G 5/34 |

* cited by examiner

SYSTEMS AND METHODS FOR MONITORING A FLIGHT PLAN OF AN AIRCRAFT

CROSS-REFERENCE TO RELATED APPLICATION

This application is a continuation-in-part of U.S. patent application Ser. No. 17/653,667, filed Mar. 7, 2022, entitled "Systems and Methods for Monitoring a Flight Plan of an Aircraft," now U.S. Pat. No. 12,354,485, which is hereby incorporated by reference in its entirety.

FIELD OF THE DISCLOSURE

Examples of the present disclosure generally relate to systems and methods for monitoring a flight plan (such as which is submitted to air traffic control) for an aircraft that is to fly from a departure location to an arrival location.

BACKGROUND OF THE DISCLOSURE

Aircraft are used to transport passengers and cargo between various locations. Numerous aircraft depart from and arrive at a typical airport every day.

Before an aircraft departs from an airport, a flight planner (for example, certified dispatchers, flight/mission planners, an actual flight crew, and/or the like) files or otherwise submits a flight plan, which includes a requested route from the location of the airport to a destination airport. Based on the flight plan, the flight crew determines an amount of fuel, a flight time, and various other aspects for the flight between the two locations.

The flight plan is submitted to air traffic control, such as located at the airport. Air traffic control personnel review the flight plan to determine whether or not the requested flight plan is acceptable and authorized. Air traffic control may modify the flight plan. In many cases, air traffic control may not actually respond to a flight planner or operator with a modified flight plan, but does publish the modified flight plan to general data feeds, such as managed by a regulatory agency (for example, the United States Federal Aviation Administration (FAA)).

A flight crew typically decides how much fuel to load on an aircraft, and reviews weather and other advisory information, based on a flight plan, which has been filed with air traffic control. As the flight crew prepares the aircraft for departure, air traffic control provides the flight crew with a clearance that may not match the flight plan, as filed, thereby leading to extra work for the flight crew to evaluate the new route. In certain cases, the flight crew may decide to add unnecessary fuel to the aircraft, and/or review extraneous information because of uncertainty in the route to a destination that may ultimately be assigned.

In general, the flight planner of the aircraft may not be informed of the modification to a flight plan until shortly before a scheduled departure, such as less than five minutes before a scheduled departure. As such, the flight planner may have a brief period of time to reassess various aspects for the flight, such as fuel, flight time, and the like.

SUMMARY OF THE DISCLOSURE

A need exists for a system and a method for monitoring modifications to a flight plan for an aircraft. Further, a need exists for a system and a method for notifying an operator of an aircraft of modifications to a proposed flight plan.

With those needs in mind, certain examples of the present disclosure provide a system including a monitoring control unit configured to compare an initial flight plan, as generated by a flight planner for an aircraft, and an assessed flight plan, as determined by air traffic control. The monitoring control unit is configured to determine one or more differences between the initial flight plan and the assessed flight plan. The monitoring control unit is configured to output a notification signal to the flight planner regarding the one or more differences between the initial flight plan and the assessed flight plan.

In at least one example, the air traffic control is configured to receive the initial flight plan from the flight planner, and determine the assessed flight plan from the initial flight plan.

In at least one example, the system also includes a flight plan publication sub-system in communication with the monitoring control unit and the air traffic control. The flight plan publication sub-system is configured to receive the assessed flight plan from the air traffic control. The flight plan publication sub-system is configured to publish the assessed flight plan. As an example, the flight plan publication sub-system includes a System Wide Information Management (SWIM) publication service.

In at least one example, in response to the monitoring control unit determining that the assessed flight plan matches the initial flight plan, the monitoring control unit is configured to inform the flight planner that the initial flight plan is approved.

In at least one example, the monitoring control unit is configured to automatically output the notification signal immediately, in real time, in response to determining the one or more differences. The one or more differences can include one or more of a different route between locations, an amount of fuel for a flight, a predicted fuel burn, a time of flight, available cargo capacity, and/or available passenger capacity.

In at least one example, the flight planner generates a revised initial flight in response to a review of the one or more differences between the initial flight plan and the assessed flight plan.

In at least one example, the system includes one or more robots configured to receive an aspect change signal from the flight planner. The aspect change signal is based on the assessed flight plan and includes one or more changes to one or more aspects of a flight of the aircraft. The one or more robots automatically change one or more aspects for the flight based on the aspect change signal. The robots are configured to automatically operate. The one or more changes to the one or more aspects include one or more of reduction or addition of fuel, reduction or addition of cargo, or reduction or addition of passenger capacity.

Certain examples of the present disclosure provide a method including comparing, by a monitoring control unit, an initial flight plan, as generated by a flight planner for an aircraft, and an assessed flight plan, as determined by air traffic control; determining, by the monitoring control unit, one or more differences between the initial flight plan and the assessed flight plan; and outputting, by the monitoring control unit, a notification signal to the flight planner regarding the one or more differences between the initial flight plan and the assessed flight plan.

Certain examples of the present disclosure provide a system including a monitoring control unit configured to compare an initial flight plan, as generated by a flight planner for an aircraft, and an assessed flight plan, as determined by air traffic control. The monitoring control unit is further configured to determine one or more alternate initial flight plans that differ from the initial flight plan in response to determining one or more differences between the initial flight plan and the assessed flight plan.

In at least one example, the monitoring control unit is further configured to present the one or more alternate initial flight plans on a display of a user interface. In at least one example, the monitoring control unit is further configured to allow for selection between the initial flight plan and the one or more alternate initial flight plans.

In at least one example, the monitoring control unit is further configured to automatically select one of the one or more alternate initial flight plans.

Certain examples of the present disclosure provide a method including comparing, by a monitoring control unit, an initial flight plan, as generated by a flight planner for an aircraft, and an assessed flight plan, as determined by air traffic control; and determining, by the monitoring control unit, one or more alternate initial flight plans that differ from the initial flight plan in response to determining one or more differences between the initial flight plan and the assessed flight plan.

Certain examples of the present disclosure provide a non-transitory computer-readable storage medium comprising executable instructions that, in response to execution, cause one or more control units comprising a processor, to perform operations including comparing an initial flight plan, as generated by a flight planner for an aircraft, and an assessed flight plan, as determined by air traffic control; and determining one or more alternate initial flight plans that differ from the initial flight plan in response to determining one or more differences between the initial flight plan and the assessed flight plan.

DETAILED DESCRIPTION OF THE DISCLOSURE

Figure 1:
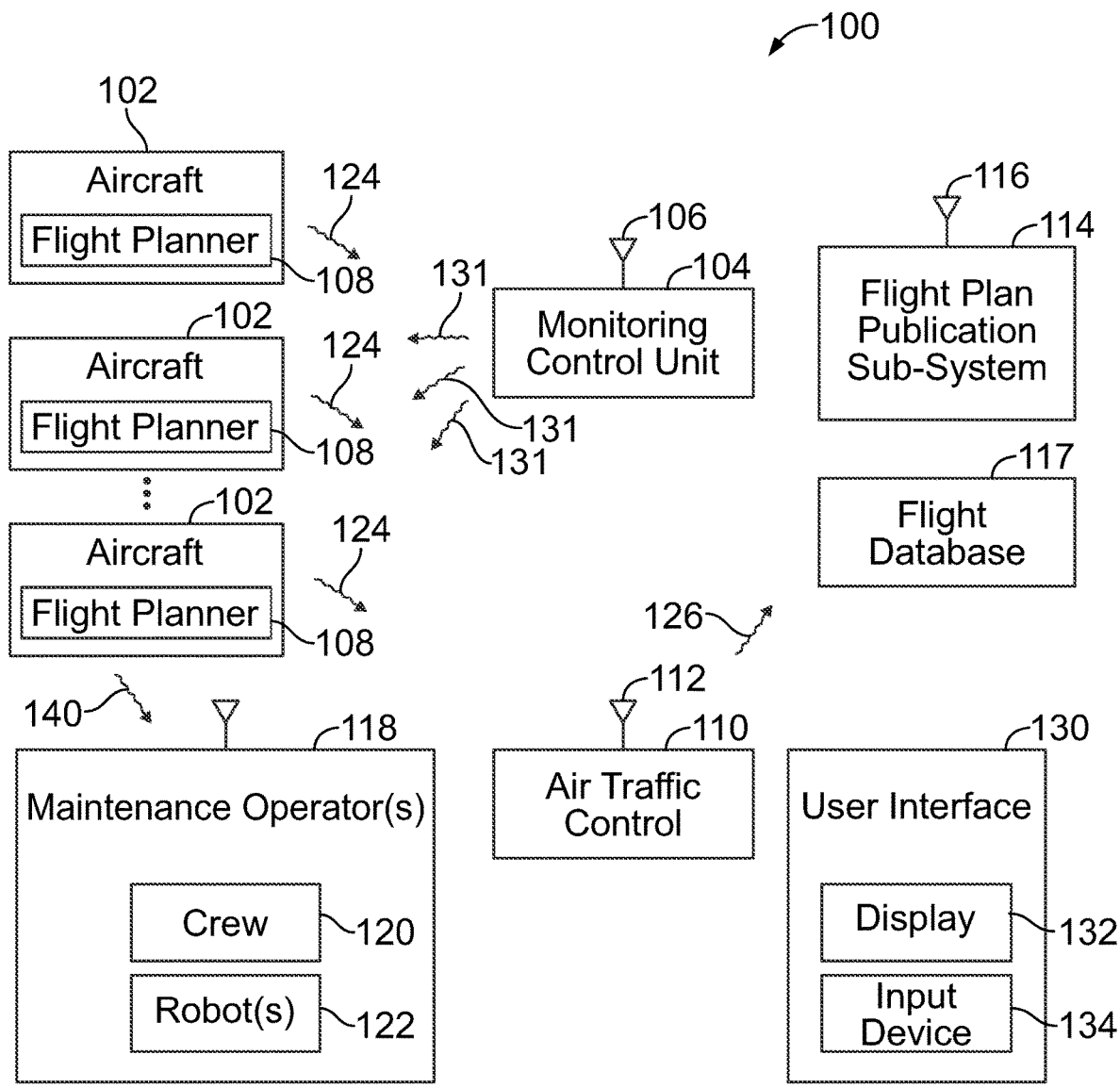
FIG. 1 illustrates a schematic block diagram of a system for monitoring a flight plan of an aircraft, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Knowing which route is more likely to be assigned for an aircraft ahead of time allows flight planners to more efficiently use their preparation time and more confidently reduce fuel loaded, which reduces total operating cost and might allow more cargo and/or passengers to be carried. Additionally, knowing the impact of the route air traffic control will assign in advance allows a flight planner (for example, a flight crew, a pilot, and/or an airline operator) to search for better alternatives, which may better meet operational needs, reduce fuel required for a flight, and/or achieve on-time flight departures.

Certain examples of the present disclosure provide a flight plan monitoring system and method. In at least one example, a flight planner (for example, pilot, flight crew personnel, aircraft operator, or other such individual and/or an automated agent) chooses an initial flight plan for an aircraft. The initial flight plan includes a desired route for a flight from a departure location to an arrival location. The initial flight plan is submitted to (for example, filed with) air traffic control (for example, air traffic control personnel and/or an agency associated with air traffic control). The initial flight plan provides an intent to operate the aircraft between the two different locations. In at least one example, the initial flight plan is not treated as a binding flight plan, as it may be modified.

After the flight plan is filed with air traffic control, a monitoring control unit monitors information published by one or more agencies (such as air traffic control, the FAA, and/or the like). The information includes the route the air traffic control intends to assign to the aircraft on departure. The monitoring control unit compares the initial flight plan, as submitted by the flight crew, with an assessed flight plan as determined by the air traffic control. If the monitoring control unit determines one or more differences between the initial flight plan and the assessed flight plan, the monitoring control unit outputs an alert to the flight crew of the differences, and how such differences affect various flight aspects for the flight. Examples of the flight aspects include an amount of fuel for the aircraft, cargo and/or passenger capacity (for example, if less fuel is needed, additional cargo and/or passenger capacity may be available). If the monitoring control unit determines that the air traffic control intends to clear the aircraft on the same route filed (that is, the initial flight plan matches the assessed flight plan), the monitoring control unit notifies the flight crew, and the initial flight plan is sent to the flight crew of the aircraft to be used as the operational flight plan (that is, the actual flight plan that is to be used to fly from the departure location to the arrival location).

If, however, the monitoring control unit determines that the air traffic control intends to clear the aircraft on a different route (that is, the assessed flight plan includes one or more differences from the initial flight plan), the monitoring control unit automatically re-calculates a flight plan in relation to the assessed flight plan (as intended by the air traffic control), and outputs a signal including the assessed flight plan to the flight planner, including a comparison between the new flight plan (that is, the assessed flight plan) and the original flight plan (that is, the initial flight plan). The comparison may include the differences in total fuel required, planned fuel burn, planned flight time, operating cost, maximum available payload or weight, and/or the like.

The flight planner can then choose to send the original plan to the flight crew (or vice versa) with summary information about the assessed flight plan (for example, the different route and different fuel estimates). Optionally, the flight planner and/or crew can send the new plan with information including differences from the original flight plan. Optionally, the flight planner and/or crew can continue searching for a new option that is more favorable for the operating organization.

Examples of the present disclosure provide systems and methods that automatically monitor, recalculate, and compare flight plan data, thereby substantially reducing time and labor for a flight planner.

Examples of the present disclosure provide systems and methods for automatically updating flight plans with changes from air traffic control. In at least one example, the systems and methods use System-Wide Information Management (SWIM) data and recalculate required fuel, flight time, operating cost, and available payload. Examples of the present disclosure address the problem of air traffic control cleared routes differing from those in filed flight plans, which could otherwise create last-minute changes and uncertainty for pilots and planners.

FIG. 1 illustrates a schematic block diagram of a system 100 for monitoring a flight plan of an aircraft 102, according to an example of the present disclosure. The system 100 includes a monitoring control unit 104 in communication with one or more aircraft 102. The monitoring control unit 104 includes a communication device 106 that is configured to allow for communication between the monitoring control unit 104 and the aircraft 102. For example, the communication device 106 can be one or more of an antenna, a radio, a transceiver, a wired or wireless connection that allows for communication within a network, and/or the like. The monitoring control unit 104 can be in communication with more or less aircraft 102 than shown.

In at least one example, the monitoring control unit 104 is remotely located from the aircraft 102. As another example, the monitoring control unit 104 can be aboard an aircraft 102.

A flight planner 108 is associated with one or more of the aircraft 102. For example, each aircraft 102 can be associated with a separate and distinct flight planner 108. As another example, a single flight planner 108 can be associated with all of the aircraft 102. As another example, one flight planner 108 can be associated with a first subset of the aircraft 102, and another flight planner 108 can be associated with a second subset of the aircraft 102. The flight planner 108 can be a flight crew and/or pilot of an aircraft 102. As another example, the flight planner 108 can be one or more individuals at a location associated with an airline operator. In at least one example, the flight planner 108 can be an automated agent, such as a robot, which receives data and automatically determines an initial flight plan.

The monitoring control unit 104 is also in communication with air traffic control 110, such as at an airport from which the aircraft 102 are to depart. The air traffic control 110 includes a communication device 112 that allows for communication with the aircraft 102, the flight planners 108, and the monitoring control unit 104. Optionally, the monitoring control unit 104 is not in communication with the air traffic control 110. The monitoring control unit 104 can be remotely located from the air traffic control 110. Optionally, the monitoring control unit can be commonly located with the air traffic control 110, such as within a central monitoring station at an airport.

The monitoring control unit 104 is also in communication with a flight plan publication sub-system 114, which can also include a communication device 116 that allows for communication with the monitoring control unit 104 and the air traffic control 110. For example, the flight plan publication sub-system 114 can be in communication with the monitoring control unit 104 and the air traffic control 110 through one or more wired or wireless connections, such as through a private or public network. In at least one example, the monitoring control unit 104 and the air traffic control 110 are in communication with the flight plan publication sub-system 114 through the Internet. The monitoring control unit 104 can be remotely located from the flight plan publication sub-system 114. Optionally, the monitoring control unit can be commonly located with the flight plan publication sub-system 114, such as within a central monitoring station at an airport.

In at least one example, the flight plan publication sub-system 114 is a publicly available source of flight data that compiles and publishes the flight plan information for the aircraft 102. As an example, the flight plan publication sub-system 114 is a System Wide Information Management (SWIM) publication service, or other such service provided by the FAA. In at least one other example, the flight plan publication sub-system 114 can be another type of private or public messenger service that electronically provides data regarding assessed flight paths as generated and/or otherwise determined by the air traffic control 110. For example, the flight plan publication sub-system 114 can be a private or public messenger service of one or more airports, one or more flight monitoring centers, one or more regulatory agencies, and/or the like.

In at least one example, the monitoring control unit 104 is also in communication with one or more maintenance operators 118, such as through one or more wired or wireless connections. The maintenance operator(s) 118 can include a maintenance crew 120 and/or one or more robots 122.

In at least one example, the monitoring control unit 104 can also be in communication with a flight database 117, such as through one or more wired or wireless connections. The flight database 117 can store existing flight routes between different locations, past flight routes between locations, and/or the like.

The monitoring control unit 104 is also in communication with one or more user interfaces 130. For example, each flight planner 108 may have a user interface 130. The user interface 130 includes a display 132 and an input device 134. The display 132 can be an electronic monitor, television, and/or the like, and the input device 134 includes one or more of a keyboard, a mouse, a stylus, and/or the like. In at least one example, the display 132 and the input device 134 are integrated as a touchscreen interface. In at least one example, the user interface 130 is a computer workstation. As another example, the user interface 130 is a handheld device, such as a smartphone, smart tablet, or the like.

In operation, a flight planner 108 for an aircraft 102 generates an initial flight plan for the aircraft 102. The initial flight plan includes a desired route between the departure airport and an arrival airport, and one or more of an amount of fuel for the desired route, cargo capacity, passenger capacity, and/or the like. The flight planner 108 outputs an initial flight plan signal 124 that includes the initial flight plan to the air traffic control 110. The air traffic control 110 receives the flight plan signal 124 including the initial flight plan. The monitoring control unit 104 also receives the flight plan signal 124 including the initial flight plan. Optionally, the monitoring control unit 104 can receive information regarding the initial flight plan from the air traffic control 110.

In response to receiving the initial flight plan from the flight planner 108, through the initial flight plan signal 124, the air traffic control 110 assesses the initial flight plan to determine if the initial flight plan is acceptable, based on various regulations (such as promulgated by the FAA), other flights in relation to the airports, and/or the like. The air traffic control 110 may or may not modify the initial flight plan. The air traffic control 110 outputs an assessed flight plan signal 126 to the flight plan publication sub-system 114. The assessed flight plan signal 126 includes an assessed flight plan as determined by the air traffic control 110. The assessed flight plan signal 126 may or may not differ from the initial flight plan, as generated by the flight planner 108.

The assessed flight plan, as received by the flight plan publication sub-system 114 via the assessed flight plan signal 126, is published by the flight plan publication sub-system 114, such as by way of an electronic publication on an internal or external network. For example, the flight plan publication sub-system 114 can publish the assessed flight plan for the aircraft on the Internet.

The monitoring control unit 104 is in communication with the flight plan publication sub-system 114 and monitors the assessed flight plan for the aircraft 102, such as in real time. The monitoring control unit 104 compares the assessed flight plan to the initial flight plan. During the comparison, if the monitoring control unit 104 determines that the assessed flight plan matches the initial flight plan (for example, no differences between the initial flight plan and the assessed flight plan), the monitoring control unit 104 outputs a notification signal 131 to the aircraft 102 (for example, to a pilot and/or a flight planner). In this case, the notification signal 131 informs the flight planner 108 that the initial flight plan is approved, thereby becoming the operational flight plan, and the aircraft 102 can fly to the arrival location according to the initial flight plan.

In at least one example, the monitoring control unit 104 compares one or more flight aspects of the assessed flight plan and the initial flight plan. The flight aspects can include time of travel (such as time of one or more flights of a flight plan), amount of fuel for the flight plan, payload onboard the aircraft, weight of the aircraft, overflight charges, and/or the like. In at least one example, the flight aspects include all of the time of travel, the amount of fuel for the flight plan, the payload, the weight of the aircraft, and the overflight charges. The monitoring control unit 104 compares the flight aspects in relation to the assessed flight plan and the initial flight plan with respect to predetermined difference thresholds. For example, a predetermined difference threshold can be a difference of five minutes for a time of travel. Optionally, the predetermined difference threshold can be less or greater than five minutes, such as two minutes, ten minutes, twenty minutes, or more. As another example, a predetermined difference threshold for fuel can be a difference of two percent. Optionally, the predetermined difference threshold for fuel can be less or greater than two percent, such as one percent, five percent, etc.

In at least one example, the monitoring control unit 104 estimates fuel and time required for both the initial flight plan and the assessed flight plan using information available in a flight plan message, such as aircraft type, route, flight level, and/or the like. The monitoring control unit 104 can then output a signal including information regarding the difference in fuel or flight time, which can be shown on a display 132, for example, of a user interface 130 of a flight planner 108. After the flight planner 108 is notified of such difference(s), the flight planner 108 may decide to plan for the expected route or re-plan and re-file a new flight plan.

If the monitoring control unit 104 determines a difference in an aspect between the assessed flight plan and the initial flight plan, the monitoring control unit 104 provides a notification of the difference to the flight planner 108. Further, the monitoring control unit 104 can further review existing routes, past flight routes, and/or the like (such as can be received from the flight plan publication sub-system 114, and/or stored in the flight database 117) and suggest an alternate initial flight plan. The monitoring control unit 104 can assess the differences between the assessed flight plan and the initial flight plan, and, based on determined differences, suggest the alternate initial flight plan, which can include flight aspects that differ from the initial flight plan (such as a revised fuel level, a revised time (such as a shorter time), and/or the like). The monitoring control unit 104 can present, via one or more data signals, the alternate flight plan to the flight planner 108 (such as via audio signals, graphics on an electronic display of a user interface, and/or the like). The flight planner 108 can the accept or reject such alternate flight plan. In at least one example, the monitoring control unit 104 can suggest multiple alternate initial flight plans to the flight planner 108, in response to determining one or more differences between the assess flight plan and the initial flight plan. The flight planner 108 can then select one of the alternate flight plans, or the initial flight plan, as originally determined.

In at least one example, the monitoring control unit 104 automatically selects an alternative initial flight plan in response to determining one or more differences in relation to one or more flight aspects between the assessed flight plan and the initial flight plan. The monitoring control unit 104 can automatically make such selection based on input from the flight planner 108. For example, the flight planner 108 may indicate through a user interface that a reduced amount of fuel is desired. The monitoring control unit 104 can automatically select an alternate initial flight plan that has a lowest amount of fuel burn. As another example, the flight planner 108 may indicate through the user interface that a reduced amount of time of travel is desired. The monitoring control unit 104 can automatically select an alternate initial flight plan that has the least amount of flight time. As another example, the flight planner 108 can indicate that a reduced amount of overflight charges are desired. The monitoring control unit 104 can automatically select an alternate initial flight plan that has the least amount of overflight charges.

The initial flight plan may accordingly be replaced by an alternate initial flight plan. One or more alternate initial flight plans are determined by the monitoring control unit 104, such as via information provided by the flight plan publication sub-system 114, and/or data stored in the flight database 117. The monitoring control unit 104 can automatically select an alternate initial flight plan. As another example, the monitoring control unit 104 can present one or more alternate initial flight plans to a flight planner 108, such as on a display 132 of a user interface 130 of the flight planner 108. In this example, the flight planner 108 can then either select the initial flight plan (as originally determined) or one of the alternate initial flight plans.

In at least one example, the monitoring control unit 104 continually automatically monitors the assessed flight plan as published by the flight plan publication sub-system 114. In at least one example, the monitoring control unit 104 automatically outputs the notification signal 131 immediately, in real time, or otherwise substantially quickly (such as within 2 minutes or less) in response to determining at least one difference (for example, a change or other such modification) between the assessed flight plan and the initial flight plan (whether an original initial flight plan or an alternate initial flight plan).

If during the comparison, however, the monitoring control unit 104 determines one or more differences between the assessed flight plan and the initial flight plan, the monitoring control unit 104 outputs the notification signal 131 that indicates the difference(s) therebetween. For example, the assessed flight plan can differ from the initial flight plan in relation to one or more of a different route between locations, an amount of fuel for the flight, a predicted fuel burn, a time of flight, available cargo capacity, available passenger capacity, and/or the like. In this example, the flight planner 108 can then determine that the aircraft 102 should fly according to the assessed flight plan. Optionally, the flight planner 108 can generate a revised initial flight plan, and the system and method operate as described above. In at least one example, the monitoring control unit 104 can suggest one or more alternate initial flight plans, which can be presented to a flight planner 108 (such as on a display 132 of a user interface 130), and/or automatically selected by the monitoring control unit 104.

Based on the one or more difference(s) between the assessed flight plan and the initial flight plan, the flight planner 108 can reassess various aspects of the flight from the departure location and the arrival location. For example, based on the differences between the assessed flight plan and the initial flight plan, the flight planner 108 may change one or more aspects for the flight of the aircraft, such as reducing or increasing fuel, reducing or adding cargo capacity, reducing or adding passenger capacity, and/or the like.

In at least one example, the flight planner 108 outputs an aspect change signal 140 to the maintenance operator(s) 118 and/or anyone else in a flight control role. The aspect change signal 140 is based on the assessed flight plan and includes one or more changes to certain aspects of the flight of the aircraft 102. The aspect change signal 140 can include information regarding reduction or addition of fuel, reduction or addition of cargo, reduction or addition of passenger capacity, and/or the like. The maintenance operator(s) 118 receive the aspect change signal 140 and modify aspects for the flight accordingly. For example, one or more robots 122 receive the aspect change signal 140 and automatically change aspects for the flight. As a further example, based on the aspect change signal 140, which is based on the assessed flight plan as monitored by the monitoring control unit 104, the robot(s) 122 can automatically add or remove fuel in relation to the aircraft, automatically add or remove cargo from the aircraft, and/or the like.

As described herein, the system 100 includes the monitoring control unit 104, which is configured to compare an initial flight plan, as generated by a flight planner 108 for an aircraft 102, and an assessed flight plan, as determined by air traffic control 110. The monitoring control unit 104 is configured to determine one or more differences between the initial flight plan and the assessed flight plan. Further, the monitoring control unit 104 is configured to output a notification signal 131 to the flight planner 108 regarding the one or more differences between the initial flight plan and the assessed flight plan.

In at least one example, the air traffic control 110 receives the initial flight plan from the flight planner 108. The air traffic control 110 determines the assessed flight plan from the initial flight plan. For example, the air traffic control 110 reviews the initial flight plan and determines whether or not the initial flight plan is acceptable in view of one or more regulations (such as promulgated by the FAA), weather conditions between the departure location and the arrival location, air traffic conditions between the locations (such as a number of flights and their respective paths), and/or the like. If acceptable, the air traffic control 110 submits the initial flight plan as the assessed flight plan. If not acceptable, the air traffic control 110 modifies or otherwise replaces the initial flight plan, and submits the modified or replacement flight plan as the assessed flight plan.

In at least one example, the flight plan publication sub-system 114 is in communication with the monitoring control unit 104 and the air traffic control 110. The flight plan publication sub-system 114 receives the assessed flight plan from the air traffic control 110. Further, the flight plan publication sub-system 114 publishes the assessed flight plan, such as electronically on an electronic messenger service.

The flight planner 108 can decide to operate the aircraft 102 according to the initial flight plan (whether an initial flight plan as originally determined, or an alternate initial flight plan) or the assessed flight plan (if it differs from the initial flight plan). As another example, the flight planner 108 can generate a revised initial flight in response to a review of the one or more differences between the initial flight plan and the assessed flight plan.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the monitoring control unit 104 may be or include one or more processors that are configured to control operation, as described herein.

The monitoring control unit 104 is configured to execute a set of instructions that are stored in one or more data storage units or elements (such as one or more memories), in order to process data. For example, the monitoring control unit 104 may include or be coupled to one or more memories. The data storage units may also store data or other information as desired or needed. The data storage units may be in the form of an information source or a physical memory element within a processing machine.

The set of instructions may include various commands that instruct the monitoring control unit 104 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the monitoring control unit 104. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the monitoring control unit 104 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
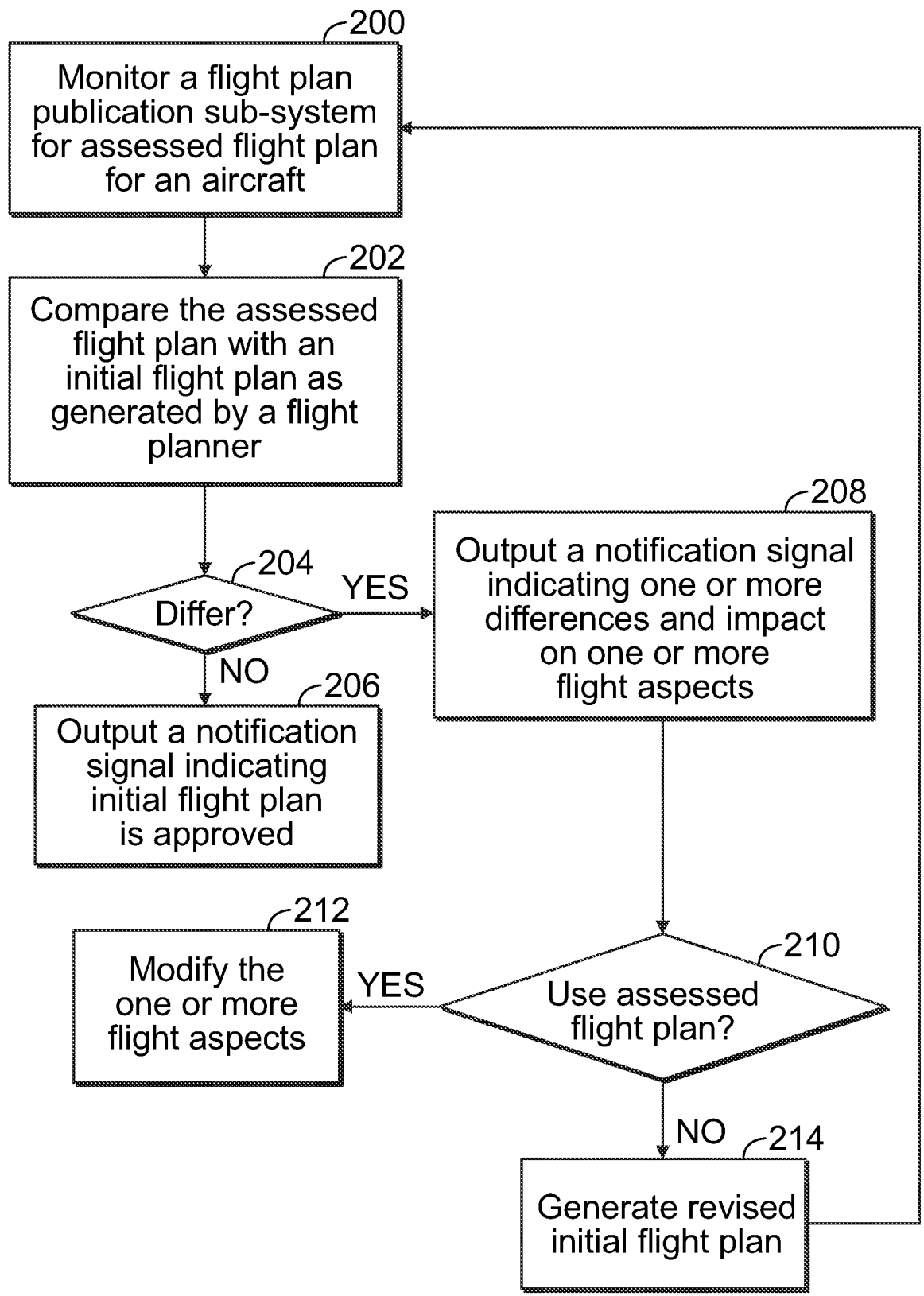
FIG. 2 illustrates a flow chart of a method for monitoring a flight plan of an aircraft, according to an example of the present disclosure.

FIG. 2 illustrates a flow chart of a method for monitoring a flight plan of an aircraft, according to an example of the present disclosure. Referring to FIGS. 1 and 2, the monitoring control unit 104 is in communication with the flight plan publication sub-system 114. At 200, the monitoring control unit monitors the flight plan publication sub-system 114 for an assessed flight plan for an aircraft 102. At 202, the monitoring control unit 104 compares the assessed flight plan (as generated by the air traffic control 110) with an initial flight plan as generated by a flight planner 108 for the aircraft 102.

At 204, the monitoring control unit 104 determines, based on the comparison, if there is one or more difference between the assessed flight plan and the initial flight plan. If there are no differences at 204, the method proceeds to 206, at which the monitoring control unit 104 outputs a notification signal 131 indicating that the initial flight plan is approved. The aircraft 102 may then fly from the departure location to the arrival location according to the initial flight plan, which is approved as the operational flight plan for flight.

If however, the monitoring control unit 104, based on the comparison, determines one or more differences between the assessed flight plan and the initial flight plan, the method proceeds from 204 to 208, at which the monitoring control unit 104 outputs a notification signal indicating the one or more differences therebetween, and an impact one or more flight aspects for the aircraft 102 due to the one or more differences. At 210, the flight planner 108 can then determine whether or not to use the assessed flight plan. If, at 210, the flight planner 108 decides that the aircraft 102 should fly according to the assessed flight plan, the method proceeds to 212, at which one or more flight aspects (for example, a route between locations, an amount of fuel for the flight, cargo capacity, passenger capacity, and/or the like) for the aircraft 102 are modified.

If, however, the flight planner 108 decides not to use the assessed flight plan at 210, the method proceeds to 214, at which the flight planner 108 generates a revised initial flight plan for the aircraft 102. The process then returns to 200.

Figure 3:
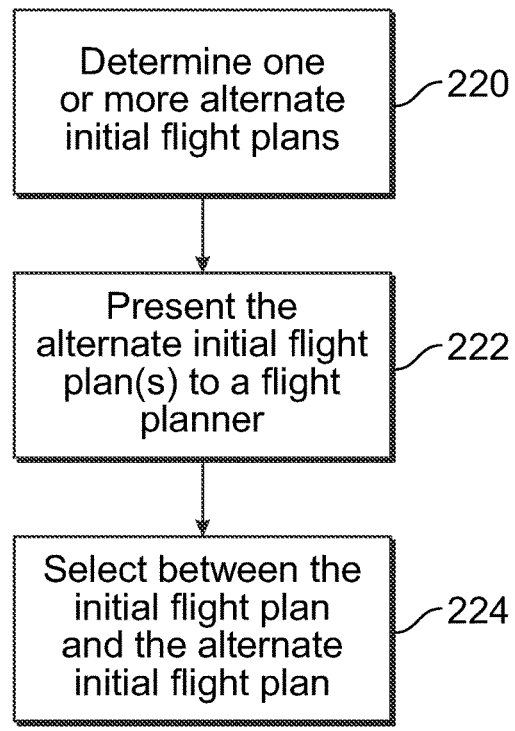
FIG. 3 illustrates a flow chart of a method for suggesting one or more alternate initial flight plans, according to an example of the present disclosure.

FIG. 3 illustrates a flow chart of a method for suggesting one or more alternate initial flight plans, according to an example of the present disclosure. Referring to FIGS. 1-3, at 204, if the monitoring control unit 104 determines a difference between the initial flight plan and the assessed flight plan, the method can proceed to 220, at which the monitoring control unit 104 determines one or more alternate flight plans that differ from the initial flight plan as originally determined. The monitoring control unit 104 can analyze information from the flight plan publication sub-system 114 and/or the flight database 117 to determine the one or more alternate flight plans.

At 222, the monitoring control unit 104 presents the alternate flight plan(s) to the flight planner 108 (such as on a display 132 of a user interface 130). At 224, the flight planner 108 then selects between the initial flight plan and one of the alternate initial flight plans. Optionally, the monitoring control unit 104 can automatically select one of the alternate flight plans. Once an alternate initial flight plan or the original initial flight plan is selected, the monitoring control unit 104 can then again assess differences with the assessed flight plan, and the method then proceeds to 228.

Examples of the subject disclosure provide systems and methods that allow large amounts of data to be quickly and efficiently analyzed by a computing device. For example, the monitoring control unit 104 can monitor initial flight plans and assessed flight plans for dozens if not hundreds of aircraft 102. Further, the monitoring control unit 104 assesses data generated by the flight plan publication sub-system 114 which can be in a format not readily discernable by a human being. As such, large amounts of data, which may not be discernable by human beings, are being tracked and analyzed. The vast amounts of data are efficiently organized and/or analyzed by the monitoring control unit 104, as described herein. The monitoring control unit 104 analyzes the data in a relatively short time in order to quickly and efficiently determine differences between initial flight plans and assessed flight plans, generate notifications in real time, and the like. A human being would be incapable of efficiently analyzing such vast amounts of data in such a short time. As such, examples of the subject disclosure provide increased and efficient functionality, and vastly superior performance in relation to a human being analyzing the vast amounts of data.

In at least one embodiment, components of the system 100, such as the monitoring control unit 104, provide and/or enable a computer system to operate as a special computer system for monitoring and comparing flight plans for aircraft that are scheduled to depart an airport.

In at least one example, all or part of the systems and methods described herein may be or otherwise include an artificial intelligence (AI) or machine-learning system that can automatically perform the operations of the methods also described herein. For example, the monitoring control unit 104 can be an artificial intelligence or machine learning system. These types of systems may be trained from outside information and/or self-trained to repeatedly improve the accuracy with how data is analyzed to automatically assess flight plans. Over time, these systems can improve by determining such information with increasing accuracy and speed, thereby significantly reducing the likelihood of any potential errors. For example, the AI or machine-learning systems can learn and determine the performance capabilities of aircraft, traffic at airports, schedules, historical flight data, and the like, and automatically assess flight plans. The AI or machine-learning systems described herein may include technologies enabled by adaptive predictive power and that exhibit at least some degree of autonomous learning to automate and/or enhance pattern detection (for example, recognizing irregularities or regularities in data), customization (for example, generating or modifying rules to optimize record matching), and/or the like. The systems may be trained and re-trained using feedback from one or more prior analyses of the data, ensemble data, and/or other such data. Based on this feedback, the systems may be trained by adjusting one or more parameters, weights, rules, criteria, or the like, used in the analysis of the same. This process can be performed using the data and ensemble data instead of training data, and may be repeated many times to repeatedly improve the determination of flight plans. The training minimizes conflicts and interference by performing an iterative training algorithm, in which the systems are retrained with an updated set of data (for example, data received before, during, and/or after each flight of the aircraft) and based on the feedback examined prior to the most recent training of the systems. This provides a robust analysis model that can better determine situational information in a cost effective and efficient manner.

Figure 4:
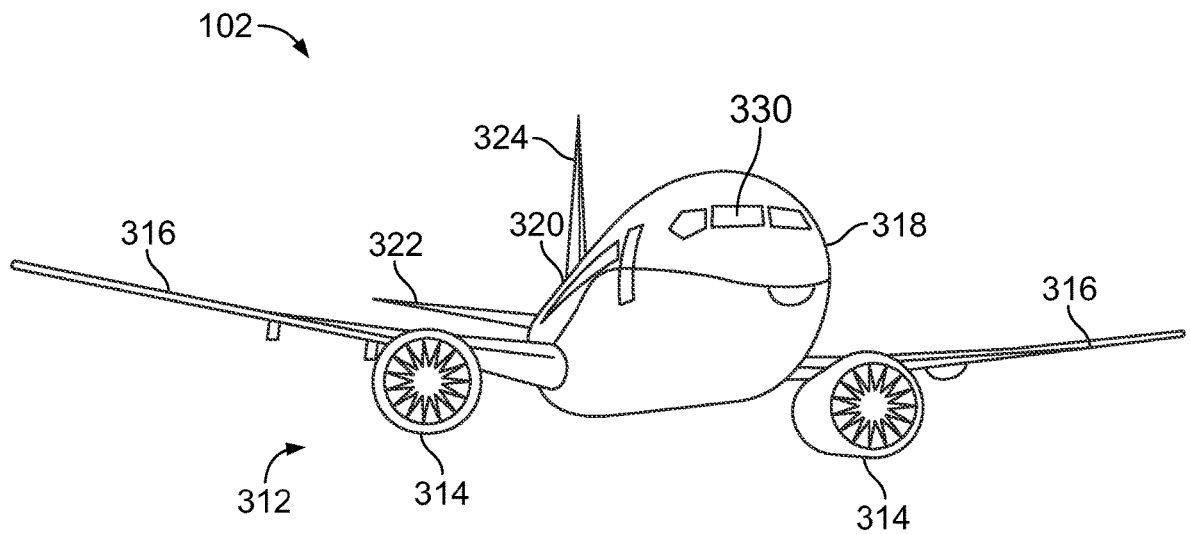
FIG. 4 illustrates a perspective front view of an aircraft, according to an example of the present disclosure.

FIG. 4 illustrates a perspective front view of an aircraft 102, according to an example of the present disclosure. The aircraft 102 includes a propulsion system 312 that includes engines 314, for example. Optionally, the propulsion system 312 may include more engines 314 than shown. The engines 314 are carried by wings 316 of the aircraft 102. In other embodiments, the engines 314 may be carried by a fuselage 318 and/or an empennage 320. The empennage 320 may also support horizontal stabilizers 322 and a vertical stabilizer 324. The fuselage 318 of the aircraft 102 defines an internal cabin 330, which includes a flight deck or cockpit, one or more work sections (for example, galleys, personnel carry-on baggage areas, and the like), one or more passenger sections (for example, first class, business class, and coach sections), one or more lavatories, and/or the like.

FIG. 4 shows an example of an aircraft 102. It is to be understood that the aircraft 102 can be sized, shaped, and configured differently than shown in FIG. 3. Further, the aircraft 102 shown and described with respect to FIG. 1 can be configured as shown in FIG. 4. Optionally, one or more of the aircraft 102 shown and described with respect to FIG. 1 can be sized, shaped and configured differently than shown in FIG. 4.

Further, the disclosure comprises examples according to the following clauses:

Clause 1. A system comprising:
a monitoring control unit configured to:
compare an initial flight plan, as generated by a flight planner for an aircraft, and an assessed flight plan, as determined by air traffic control, and
determine one or more alternate initial flight plans that differ from the initial flight plan in response to determining one or more differences between the initial flight plan and the assessed flight plan.

Clause 2. The system of Clause 1, wherein the monitoring control unit is further configured to present the one or more alternate initial flight plans on a display of a user interface.

Clause 3. The system of Clause 2, wherein the monitoring control unit is further configured to allow for selection between the initial flight plan and the one or more alternate initial flight plans.

Clause 4. The system of any of Clauses 1-3, wherein the monitoring control unit is further configured to automatically select one of the one or more alternate initial flight plans.

Clause 5. The system of any of Clauses 1-4, further comprising a flight plan publication sub-system in communication with the monitoring control unit and the air traffic control, wherein the flight plan publication sub-system is configured to receive the assessed flight plan from the air traffic control, and wherein the flight plan publication sub-system is configured to publish the assessed flight plan.

Clause 6. The system of Clause 5, wherein the flight plan publication sub-system comprises a System Wide Information Management (SWIM) publication service.

Clause 7. The system of any of Clauses 1-6, wherein the one or more differences comprise one or more of a different route between locations, an amount of fuel for a flight, a predicted fuel burn, a time of flight, available cargo capacity, or available passenger capacity.

Clause 8. The system of any of Clauses 1-7, further comprising one or more robots, wherein the one or more robots are configured to receive an aspect change signal from the flight planner, wherein the aspect change signal is based on the assessed flight plan and comprises one or more changes to one or more aspects of a flight of the aircraft, and wherein the one or more robots are configured to automatically change one or more aspects for the flight based on the aspect change signal.

Clause 9. The system of Clause 8, wherein the one or more changes to the one or more aspects comprises one or more of reduction or addition of fuel, reduction or addition of cargo, or reduction or addition of passenger capacity.

Clause 10. The system of any of Clauses 1-9, wherein the monitoring control unit is an artificial intelligence (AI) or machine-learning system.

Clause 11. A method comprising:
comparing, by a monitoring control unit, an initial flight plan, as generated by a flight planner for an aircraft, and an assessed flight plan, as determined by air traffic control; and
determining, by the monitoring control unit, one or more alternate initial flight plans that differ from the initial flight plan in response to determining one or more differences between the initial flight plan and the assessed flight plan.

Clause 12. The method of Clause 11, further comprising presenting, by the monitoring control unit, the one or more alternate initial flight plans on a display of a user interface.

Clause 13. The method of Clause 12, further comprising allowing, by the monitoring control unit, selection between the initial flight plan and the one or more alternate initial flight plans.

Clause 14. The method of any of Clauses 11-13, further comprising automatically selecting, by the monitoring control unit, one of the one or more alternate initial flight plans.

Clause 15. The method of any of Clauses 11-14, further comprising: receiving, by a flight plan publication sub-system in communication with the monitoring control unit and the air traffic control, the assessed flight plan from the air traffic control; and
publishing, by the flight plan publication sub-system, the assessed flight plan.

Clause 16. The method of any of Clauses 11-15, wherein the one or more differences comprise one or more of a different route between locations, an amount of fuel for a flight, a predicted fuel burn, a time of flight, available cargo capacity, or available passenger capacity.

Clause 17. The method of any of Clauses 11-16, further comprising:
receiving, by one or more robots, an aspect change signal from the flight planner, wherein the aspect change signal is based on the assessed flight plan and comprises one or more changes to one or more aspects of a flight of the aircraft; and
automatically changing, by the one or more robots, one or more aspects for the flight based on the aspect change signal.

Clause 18. The method of Clause 17, wherein the one or more changes to the one or more aspects comprises one or more of reduction or addition of fuel, reduction or addition of cargo, or reduction or addition of passenger capacity.

Clause 19. The method of any of Clauses 11-18, wherein the monitoring control unit is an artificial intelligence (AI) or machine-learning system.

Clause 20. A non-transitory computer-readable storage medium comprising executable instructions that, in response to execution, cause one or more control units comprising a processor, to perform operations comprising:
comparing an initial flight plan, as generated by a flight planner for an aircraft, and an assessed flight plan, as determined by air traffic control; and
determining one or more alternate initial flight plans that differ from the initial flight plan in response to determining one or more differences between the initial flight plan and the assessed flight plan.

As described herein, examples of the present disclosure provide systems and methods for monitoring modifications to a flight plan for an aircraft. Further, examples of the present disclosure provide systems and methods for notifying an operator of an aircraft of modifications to a proposed flight plan.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system comprising:
a monitoring control unit including one more processors configured to:
compare an initial flight plan, as generated by a flight planner for an aircraft, and an assessed flight plan, as determined by air traffic control,
continually automatically monitor information published by a flight plan publication sub-system in real time,
receive the information in real time from the flight plan publication sub-system as the information is published, wherein the information includes a route the air traffic control intends to assign to the aircraft on departure, and wherein the information is not sent by the air traffic control to the aircraft, and
determine one or more alternate initial flight plans that differ from the initial flight plan in response to determining one or more differences between the initial flight plan and the assessed flight plan.

2. The system of claim 1, wherein the monitoring control unit is further configured to present the one or more alternate initial flight plans on a display of a user interface.

3. The system of claim 2, wherein the monitoring control unit is further configured to allow for selection between the initial flight plan and the one or more alternate initial flight plans.

4. The system of claim 1, wherein the monitoring control unit is further configured to automatically select one of the one or more alternate initial flight plans.

5. The system of claim 1, further comprising the flight plan publication sub-system in communication with the monitoring control unit and the air traffic control, wherein the flight plan publication sub-system is configured to receive the assessed flight plan from the air traffic control, and wherein the flight plan publication sub-system is configured to publish the assessed flight plan.

6. The system of claim 5, wherein the flight plan publication sub-system comprises a System Wide Information Management (SWIM) publication service.

7. The system of claim 1, wherein the one or more differences comprise one or more of a different route between locations, an amount of fuel for a flight, a predicted fuel burn, a time of flight, available cargo capacity, or available passenger capacity.

8. The system of claim 1, further comprising one or more robots, wherein the one or more robots are configured to receive an aspect change signal from the flight planner, wherein the aspect change signal is based on the assessed flight plan and comprises one or more changes to one or more aspects of a flight of the aircraft, and wherein the one or more robots are configured to automatically change one or more aspects for the flight based on the aspect change signal.

9. The system of claim 8, wherein the one or more changes to the one or more aspects comprises one or more of reduction or addition of fuel, reduction or addition of cargo, or reduction or addition of passenger capacity.

10. The system of claim 1, wherein the monitoring control unit is an artificial intelligence (AI) or machine-learning system.

11. The system of claim 1, wherein the monitoring control unit is further configured to output notification signals to the flight planner regarding the information including one or more differences between the initial flight plans and the assessed flight plans.

12. A method comprising:
 comparing, by a monitoring control unit including one or more processors, an initial flight plan, as generated by a flight planner for an aircraft, and an assessed flight plan, as determined by air traffic control;
 continually automatically monitoring, by the monitoring control unit, information published by a flight plan publication sub-system in real time;
 receiving, by the monitoring control unit, the information in real time from the flight plan publication sub-system as the information is published, wherein the information includes a route the air traffic control intends to assign to the aircraft on departure, and wherein the information is not sent by the air traffic control to the aircraft; and
 determining, by the monitoring control unit, one or more alternate initial flight plans that differ from the initial flight plan in response to determining one or more differences between the initial flight plan and the assessed flight plan.

13. The method of claim 12, further comprising presenting, by the monitoring control unit, the one or more alternate initial flight plans on a display of a user interface.

14. The method of claim 13, further comprising allowing, by the monitoring control unit, selection between the initial flight plan and the one or more alternate initial flight plans.

15. The method of claim 12, further comprising automatically selecting, by the monitoring control unit, one of the one or more alternate initial flight plans.

16. The method of claim 12, further comprising:
 receiving, by the flight plan publication sub-system in communication with the monitoring control unit and the air traffic control, the assessed flight plan from the air traffic control; and
 publishing, by the flight plan publication sub-system, the assessed flight plan.

17. The method of claim 12, wherein the one or more differences comprise one or more of a different route between locations, an amount of fuel for a flight, a predicted fuel burn, a time of flight, available cargo capacity, or available passenger capacity.

18. The method of claim 12, further comprising:
 receiving, by one or more robots, an aspect change signal from the flight planner, wherein the aspect change signal is based on the assessed flight plan and comprises one or more changes to one or more aspects of a flight of the aircraft; and
 automatically changing, by the one or more robots, one or more aspects for the flight based on the aspect change signal.

19. The method of claim 18, wherein the one or more changes to the one or more aspects comprises one or more of reduction or addition of fuel, reduction or addition of cargo, or reduction or addition of passenger capacity.

20. A non-transitory computer-readable storage medium comprising executable instructions that, in response to execution, cause one or more control units comprising a processor, to perform operations comprising:
 comparing an initial flight plan, as generated by a flight planner for an aircraft, and an assessed flight plan, as determined by air traffic control;
 continually automatically monitoring information published by a flight plan publication sub-system in real time;
 receiving the information in real time from the flight plan publication sub-system as the information is published, wherein the information includes a route the air traffic control intends to assign to the aircraft on departure, and wherein the information is not sent by the air traffic control to the aircraft; and
 determining one or more alternate initial flight plans that differ from the initial flight plan in response to determining one or more differences between the initial flight plan and the assessed flight plan.

* * * * *